(12) United States Patent
Kataho et al.

(10) Patent No.: US 8,034,277 B2
(45) Date of Patent: Oct. 11, 2011

(54) METHOD AND APPARATUS FOR PATTERN TRANSFER, AND ANNULAR RECORDING MEDIUM

(75) Inventors: Hideaki Kataho, Kanagawa (JP); Hiroshi Okada, Kanagawa (JP); Kenya Wada, Tokyo (JP); Hisayoshi Ichikawa, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 145 days.

(21) Appl. No.: 12/571,513

(22) Filed: Oct. 1, 2009

(65) Prior Publication Data

US 2010/0015380 A1    Jan. 21, 2010

Related U.S. Application Data

(62) Division of application No. 11/840,280, filed on Aug. 17, 2007, now Pat. No. 7,600,993.

(30) Foreign Application Priority Data

Aug. 21, 2006  (JP) .................................. 2006-224248

(51) Int. Cl.
*B29C 59/00* (2006.01)

(52) U.S. Cl. ......... 264/293; 264/106; 264/107; 425/385

(58) Field of Classification Search .................. 425/385; 101/407.1, 474, 408; 264/106, 107, 293
See application file for complete search history.

(56) References Cited

U.S. PATENT DOCUMENTS

| 5,888,433 A | 3/1999 | Amo |
| 6,939,120 B1 | 9/2005 | Harper |

FOREIGN PATENT DOCUMENTS

JP     06-000876     1/2004

*Primary Examiner* — Christina Johnson
*Assistant Examiner* — Galen Hauth
(74) *Attorney, Agent, or Firm* — Antonelli, Terry, Stout & Kraus, LLP.

(57) ABSTRACT

An apparatus for transferring a pattern of minute surface structures, using a pair of press members which are located opposingly for movements toward and away from each other. One press member is adapted to support thereon a mold having on a transfer surface a master pattern of minute structures to be transferred, while the other press member is adapted to support thereon an annular substrate plate having a curable resin layer coated thereon and to press the resin layer against the transfer surface of the mold to transfer said minute structures to the resin layer. The mold is provided with a circular center hole defining at least three small-diameter segments and three large-diameter segments alternately and at uniform angular intervals along an inner periphery of the mold. The annular substrate plate has an inside diameter exactly matching with the small-diameter segments at the inner periphery of the mold.

1 Claim, 7 Drawing Sheets

METHOD AND APPARATUS FOR PATTERN TRANSFER, AND ANNULAR RECORDING MEDIUM

CROSS REFERENCE TO RELATED APPLICATION

This application is a divisional application of U.S. application Ser. No. 11/840,280, filed Aug. 17, 2007 now U.S. Pat. No. 7,600,993, the contents of which are incorporated herein by reference.

BACKGROUND OF THE INVENTION

1. Field of the Art

This invention relates to a method and apparatus for transferring a pattern of minute structures formed on a transfer surface of a mold, onto a resin layer coated on a substrate plate, and to an annular recording medium produced by that method.

2. Prior Art

For example, for the purpose of increasing a recording density, lately a nano-pattern imprinting technology is applied in the manufacture of storage media like annular optical discs which are in use as data recording media. In nano-pattern imprinting, a pattern of infinitesimally minute structures which are formed on a transfer mold is pressed on a thin curable resin layer coated on a substrate plate or sheet to imprint the minute structures on the resin layer. A nano-pattern consists of a multitude of minute structures in the form of dents and projections of a linear shape or of a pillar-like shape, ranging from several tens to several hundreds nanometers in size.

A nano-pattern is imprinted on an energy ray-setting resin, e.g., a thermosetting resin, a photo-setting resin or an electron ray-setting resin. Typical of energy ray-setting resins in general use are ultraviolet curing resins. Photo-setting resins including ultraviolet resins can be used at room temperature and have been in wide use in the fields of pattern transfer because of their fast hardening ability.

In a pattern transfer process of this sort, a resin in a softened or liquid state is coated on a surface of a substrate plate, and a master pattern on a transfer mold is pressed on the coated resin layer under a predetermined pressure to imprint minute structures of the master pattern on the resin layer. The imprinted resin layer is then hardened by irradiation with ultraviolet rays. A transfer mold with a high ultraviolet transmittivity is used in case ultraviolet rays are irradiated through the transfer mold. Normally, minute structures of a master pattern are formed on a transfer surface of the mold by lithography or the like.

Minute structures of a master pattern are imprinted on a resin layer on a substrate plate which is held in pressed contact with a transfer mold. Thus, after hardening the imprinted resin layer, the substrate plate needs to be separated from the transfer mold, for example, by mechanically separating the substrate plate from the transfer mold as described in Japanese Laid-Open Patent Application H6-876.

Namely, in this prior art, for transferring a pattern from a mold onto a substrate plate, as a transfer mold a stamper is set on an attracting table with a magnet adaptor, passing a tubular member through the magnet adaptor and fixing a stamper by means of an internal chuck ring which is formed on the tubular member. A center pin is passed through the tubular member thereby to hold the stamper fixedly in position. An upper end portion of the center pin is flanged to provide a guided positioning portion of a cylindrical shape. Thus, a substrate plate which is fitted on the positioning portion of the center pin is automatically guided into an aligned position relative to the stamper. In this state, a master pattern on the stamper is imprinted on a resin layer which is coated on the substrate plate. After hardening the imprinted resin layer, the substrate plate is separated from the stamper. As a separating mechanism, a flange portion is provided around the outer periphery of the above-mentioned positioning portion at the lower end thereof. When a substrate plate is set in position in abutting engagement with the stamper, the flange portion is retained in a position where it is slightly protruded into the stamper. Therefore, as the center pin is pushed up, the separator flange portion comes into engagement with the inner periphery of the substrate plate to separate same from the stamper.

Above-mentioned Japanese Laid-Open Patent Application H6-876 concerns an apparatus for manufacturing optical discs of the sort which has an allowance for alignment errors between the stamper and a substrate plate at the time of pattern transfer from the stamper to the substrate plate. That is to say, the positioning portion of the center pin to be brought into fitting engagement with a substrate plate can afford a certain degree of fitting allowance relative to the latter. However, in this regard, far more strict accuracy is required in nano-pattern imprinting involving transfer of infinitesimally minute structures. Therefore, it becomes difficult to comply with high positioning accuracy as required in nano-pattern imprinting due to accumulation of errors in a case where a pattern transferring side (e.g., a stamper or a transfer mold) and a pattern receiving side (e.g., a substrate plate) are set in position at and by different portions of a coaxially located positioning member, and in a case where a pattern transferring side and a receiving side are positioned by engagement with separate fitting members. Thus, the technology of Japanese Laid-Open Patent Application H6-876 cannot be applied to a field involving transfer of infinitesimally minute structures like nano-pattern imprinting. Besides, in this case, the separating flange portion is arranged to hitch the inner periphery of a substrate plate at the time of separation from a stamper, so that it may cause damages to substrate plates. In addition, in a pressing stage, the separating flange which is protruded between the stamper and a substrate plate can cause adverse effects on transfer accuracy.

SUMMARY OF THE INVENTION

In view of the foregoing situations, it is an object of the present invention to provide a method and an apparatus for pattern transfer, adopting a mechanism which is capable of positioning a substrate in an aligned position relative to a transfer mold with high accuracy, permitting to transfer a pattern of infinitesimally minute structures from the transfer mold to the substrate plate, and separating a pressed substrate plate smoothly and securely from the mold without causing damages to the substrate plate.

According to the present invention, in order to achieve the above-stated objective, there is provided an apparatus for transferring a pattern of minute surface structures by the use of a pair of press members located opposingly for movements toward and away from each other, one press member being adapted to support thereon an annular transfer mold having on a transfer surface a master pattern of minute structures to be transferred, and the other press member being adapted to support thereon an annular substrate plate having a curable resin layer coated thereon and to press the resin layer against the transfer surface of the mold to transfer the minute structures thereto, characterized in that: the mold is provided with a center hole defining at least three small-diameter segments and three large-diameter segments alternately along an inner periphery of said transfer mold; the annular substrate plate is so formed as to have an inside diameter exactly matching with said small-diameter segments at the inner periphery of said mold; and a chuck mechanism is provided inside of the lower press member, the chuck mechanism having at least three chuck pawls located in spaced positions along inner periphery of the substrate plate, the chuck pawls being radially displaceable to take either an operative position in abutting engagement with inner periphery of the substrate plate and a receded position disengaged from the substrate plate; the chuck pawls of the chuck mechanism being adapted to grip both of the inner periphery of the substrate and the small-diameter segments of the center hole of the mold at the time of setting said substrate plate in aligned position relative to the mold, and to grip the inner periphery of said substrate plate alone, at a spaced position from a large-diameter segment of the center hole of the mold, at the time of separating the substrate plate from the mold.

The paired press members may be located in horizontally opposing positions but it is preferred to locate them in vertically opposing positions in order to set one of the substrate plate and the mold in an aligned position relative to the other. The mold and substrate plate are set on opposing surfaces of the upper and lower press members, that is, on the lower side of an upper press member and on the top side of a lower press member, respectively. For example, the transfer mold is set on the lower side of an upper pressing plate, while the substrate plate is set on the top side of a lower pressing plate. Of course, the mold and substrate plate may be set in reversed positions if desired. Arrangements may be made to drive both of the upper and lower press members toward each other. Alternatively, arrangements may be made to drive one of the two opposing press members, for example, a lower press member, toward an upper press member which is mounted in a fixed state. In that case, a substrate plate on the lower press member is pressed against the mold on the upper press member. In contrast to the transfer mold which is fixed on the upper press member, the substrate plate is set on the lower press member without using any fixation means. That is to say, the transfer mold is set accurately in position on the upper press member, but there is no need at this stage for accurately setting the substrate plate on the lower press member because it will be automatically set in an aligned position relative to the transfer mold. Clamp means maybe employed for fixing the transfer mold on the upper press member, but it is preferable to use suction grip means to facilitate attachment and detachment to and off the upper press member. In case the transfer mold is fixed by suction grip means, a number of vacuum passages are bored through the upper press member.

The curable resin layer to be imprinted with minute structures of a master pattern on the transfer mold is coated on a substrate plate in a softened or liquid state, and hardened after completion of pattern transfer. For this purpose, a thermosetting resin or an energy ray-setting resin is coated on a substrate plate. In the case of a thermosetting resin, the resin layer is hardened by heating (a heat curing resin) or by cooling (a thermoplastic resin). In this case, there are no restrictions in particular with regard to the material for the mold and substrate plate. On the other hand, in case of an energy ray-setting resin, for example, the resin layer is irradiated with light energy like ultraviolet rays or with electron rays. The resin layer is irradiated with energy rays which are irradiated from the side of the transfer mold or from the side of the substrate plate. In this case, the mold or substrate plate needs to be made of a material with satisfactory properties in energy ray transmittance. For example, in a case where an ultraviolet curing resin layer is irradiated from above through the upper press member, it is necessary for the upper press member and the mold to be formed of a material of high ultraviolet transmittance like quartz glass. In retaining the mold fixedly on a press member by suction force, suction passages which are formed in and through the press member are engaged with a blank zone of the mold which is provided in a predetermined width around the outer periphery of the pattern transfer surface of the mold.

The chuck pawls have a function of bringing a substrate plate into an aligned position relative to a transfer mold, along with a function of gripping and separating the substrate plate from the mold. The number and shape of the chuck pawls are determined depending upon small- and large-diameter segments which are defined by the center hole of the mold. Preferably, the center hole of the mold is arranged to define at least three small-diameter segments and three large-diameter segments alternately and at uniform angular intervals along the inner periphery of the mold. In a case where three small-diameter segments and three large-diameter segments formed in uniform lengths around the inner periphery of the mold, three or six chuck pawls are provided in confronting positions. In the case of a chuck mechanism with three chuck pawls, it is necessary to turn and switch the respective chuck pawls to and from a position confronting a small-diameter segment and a position confronting a large-diameter segment. For this purpose, the three chuck pawls are mounted on a revolving shaft. In the case of a chuck mechanism with six chuck pawls, there is no need for turning and switching their positions, and the chuck pawls are actuated in two separate groups each consisting of three chuck pawls.

According to the present invention, there is also provided a method for transferring a pattern of minute structures from a transfer mold mounted on one of two press members located opposingly for movements toward and away from each other and provided with a center hole defining three small-diameter segments and three large-diameter segments alternately along an inner periphery of the transfer mold, to a curable resin layer coated on an annular substrate plate mounted on the other press member and having an inside diameter exactly matching with small-diameter segments at the inner periphery of said mold, imprinting the pattern of minute structures on the resin layer by pressing same against the mold, characterized in that the method comprises the steps of: moving one pressing member toward the other to position the mold and the substrate plate in close proximity to each other; driving radially displaceable chuck pawls provided in at least three uniformly spaced positions around an inner periphery of the substrate plate to grip simultaneously both of the substrate plate and the small-diameter segments at the inner periphery of the mold thereby bringing centers of the substrate plate and the mold into alignment with each other; disengaging the chuck pawls from the inner periphery of the substrate plate and pressing the press members to each other to imprint profiles of a transfer surface of the mold on the resin layer; hardening the resin layer being still held in engagement with the mold; and driving the chuck pawls to grip the substrate plate alone at spaced positions from the large-diameter segments at the inner periphery of the mold and moving the press members away from each other to separate the substrate plate from the mold.

Thus, according to the present invention, a substrate plate can be set in an accurately aligned position relative to a transfer mold, permitting to carry out high precision transfer of minute surface structures to the substrate plate and to separate the substrate plate smoothly and securely form the mold without causing damages to the mold or substrate.

The above and other objects, features and advantages of the present invention will become apparent from the following particular description, taken in conjunction with the accompanying drawings which show by way of example preferred embodiments of the invention. Needless to say, the present invention should not be construed as being limited to particular forms shown in the drawings.

DESCRIPTION OF PREFERRED EMBODIMENTS

Figure 1:
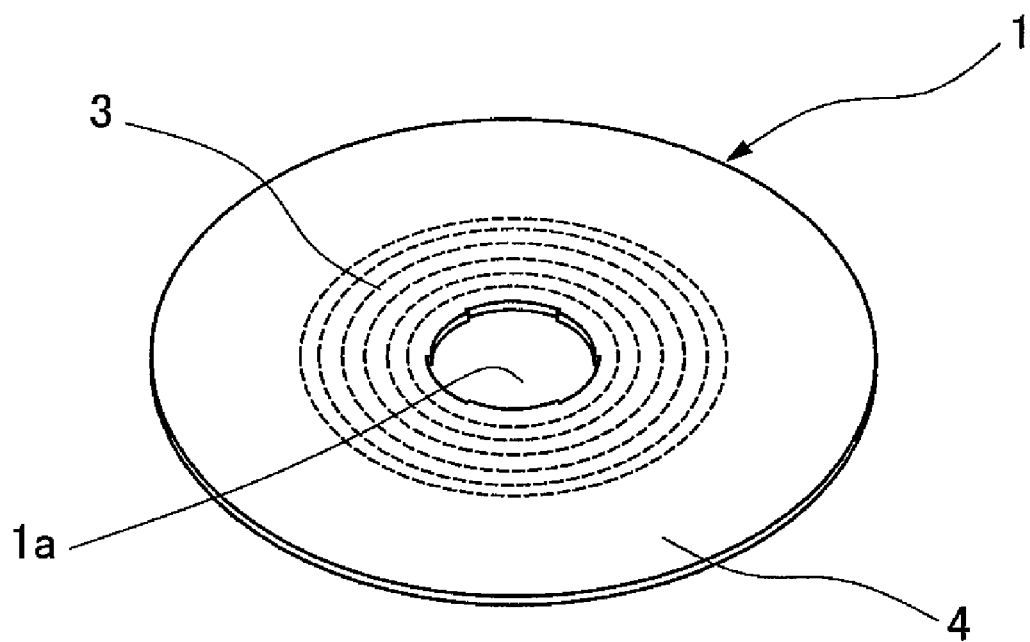
FIG. 1 is a schematic perspective view of a transfer mold and a substrate plate which are used on a pattern transfer apparatus according to the invention.
Figure 1:
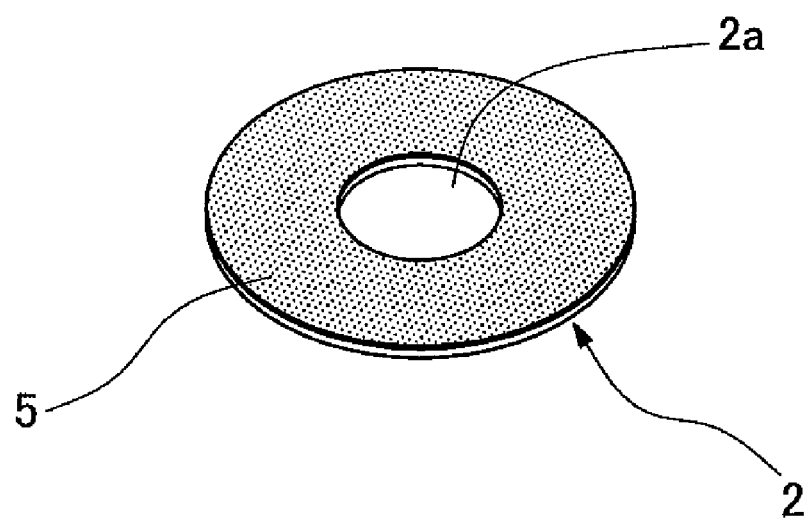

Hereafter, the present invention is described more particularly by way of its preferred embodiments, with reference to the accompanying drawings. Referring first to FIG. 1, shown at 1 is a transfer mold and at 2 a substrate plate. Both of the mold 1 and the substrate plate 2 are in the form of an annular thin plate and are provided circular center holes 1a and 2a at a center position, respectively. The transfer mold 1 is larger in diameter than the substrate plate 2, and has a transfer surface 3 in an annular zone in correspondence to an imprinting zone between inner and outer peripheral edges of the substrate plate 2, the transfer surface 3 bearing a pattern 3 of infinitesimally minute structures to be transferred. A blank zone 4 is provided around the outer periphery of the transfer surface 3. For imprinting the minute structures of a master pattern on the transfer surface 3 of the mold 1, a resin layer 5 is coated on the substrate plate 2, by the use of a curable resin like an ultraviolet curing resin, for example.

Figure 2:
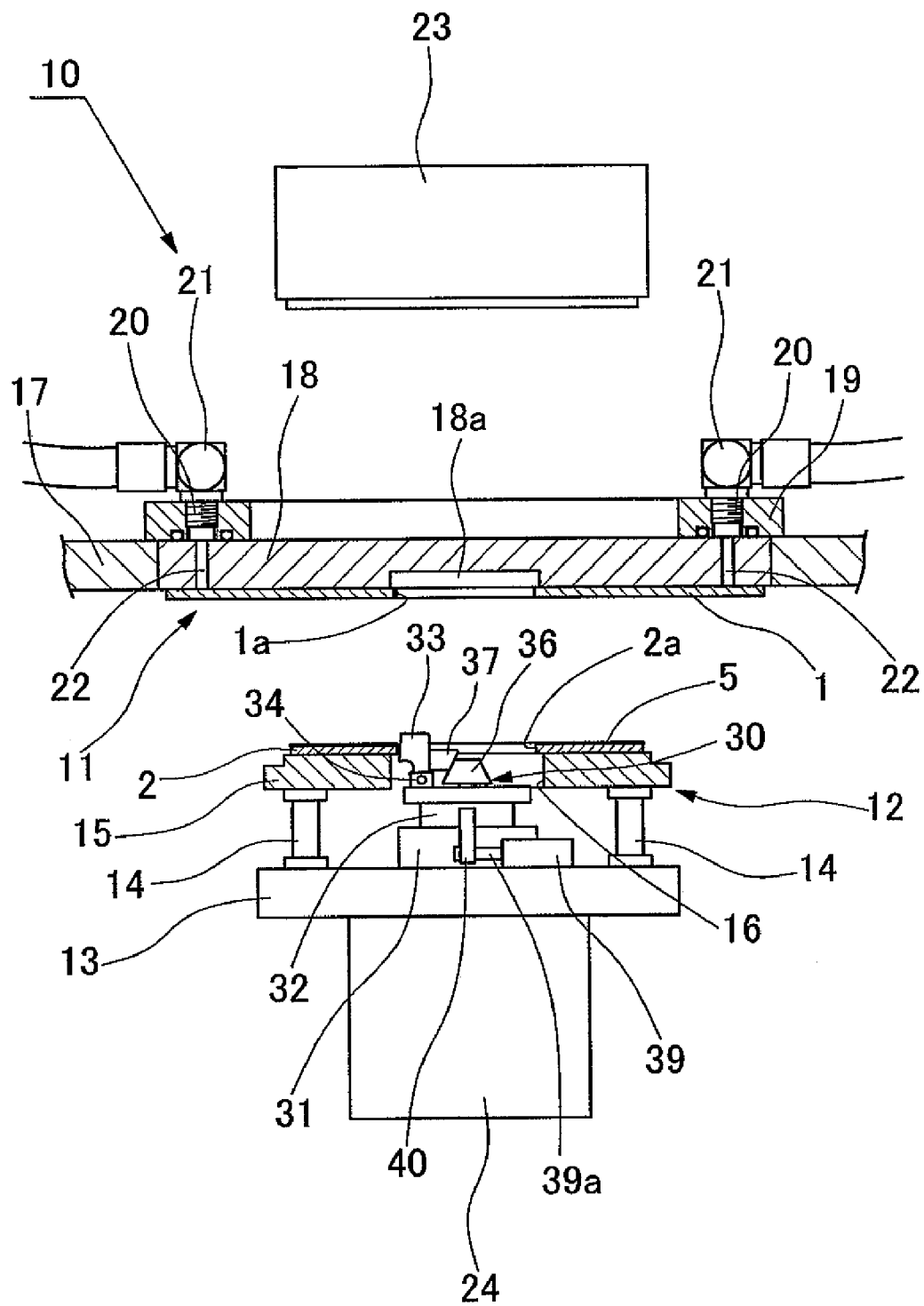
FIG. 2 is a schematic sectional view of the pattern transfer apparatus.

Schematically shown in FIG. 2 is a pattern transfer apparatus according to the invention. The pattern transfer apparatus 10 is provided with an upper press assembly 11 in a cooperatively opposing position relative to a lower press assembly 12. The upper press assembly 11 is adapted to support the transfer mold 1 on its lower side, in face to face relation with the substrate plate 2 which is set on the lower press assembly 12. In the case of the particular embodiment shown, the upper press assembly 11 is fixedly supported at a predetermined height, while the lower press assembly 12 is liftably supported for movements toward and away from the upper press assembly 11.

The lower press assembly 12 is provided with a base plate 13, a plural number of posts 14, say, four posts 14 are erected on the base plate 13 to support a lower pressing plate 15 thereon. The lower pressing plate 15 is in the form of an annular plate having a center aperture 16 which is slightly larger in diameter than the center hole 2a of the substrate plate 2. In almost the entire surface areas, the substrate plate 2 is abutted against the lower pressing plate 14. The center aperture 16 in the lower pressing plate 15 is slightly larger in diameter than the center hole 1a in the transfer mold 1.

On the other hand, the upper press assembly 11 is provided with an upper pressing plate 18 which is in the shape of an annular disc and fixedly supported on an outer frame 17. The transfer mold 1 is attached on the lower side of the upper pressing plate 18 and fixedly retained on the upper pressing plate 18 by suction force. For this purpose, an annular connection plate 19 is fixed on the upper pressing plate 18, and a vacuum pipe 21 are connected to each one of vacuum pipe connection ports 20 which are provided in the upper connection plate 19, in communication with suction passages 22 which are bored through the upper pressing plate 19. Distal ends of the suction passages 22, on the side away from the annular connection plate 19, are opened in a surface which is in abutting engagement with the transfer mold 1, i.e., in abutting engagement with the above-mentioned blank zone 4 provided around the outer periphery of the transfer surface 3 of the mold 1. In the abutting surface on the side of the transfer mold 1, the upper pressing plate 18 is provided with a circular recess 18a which is slightly larger in diameter than the center hole 1a in the transfer mold 1. This circular recess 18a is a space of escapement to avoid interference with chuck claws 33 at the time of actuating a chuck mechanism 30, which will be described later on.

Further, located overhead the upper pressing plate 18 is an ultraviolet irradiation means 23 for irradiating the resin layer 5 with ultraviolet rays. In order to irradiate the coated resin layer 5 on the substrate plate 2 effectively with ultraviolet rays from the UV irradiation means, the upper pressing plate 18 as well as the transfer mold 1 is formed of a transparent material with high ultraviolet transmittivity like quartz glass.

For movements toward and away from the upper press assembly 11, the base plate 13 of the lower press assembly 12 is mounted on a lifting drive means 24 such as a feed screw mechanism, a cam mechanism or the like. The lifting drive means 24 functions not only to lift the substrate plate 2 on the lower pressing plate 15 up and down but also to press the substrate plate 2 against the mold 1 with a predetermined imprinting pressure.

Figure 3:
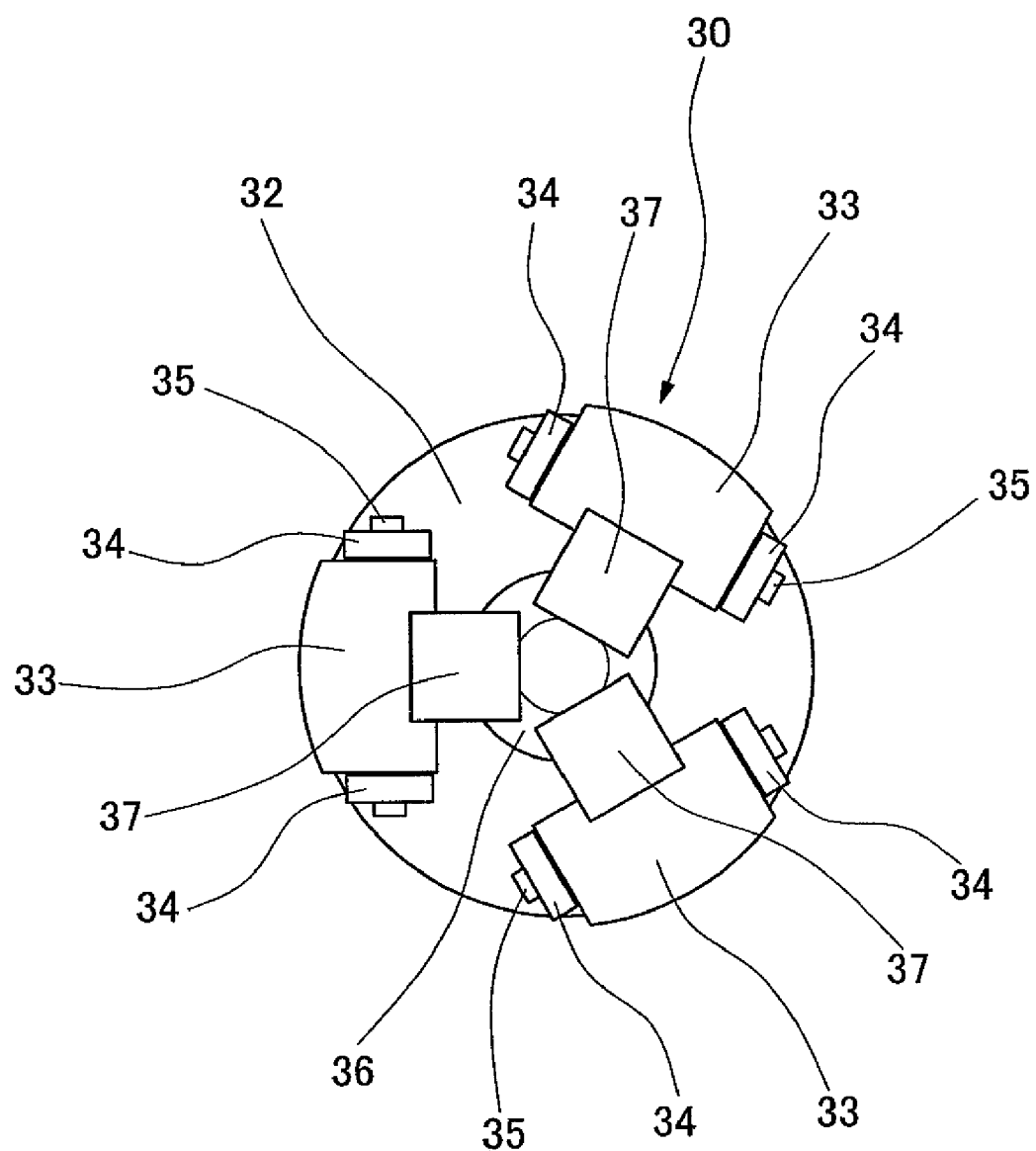
FIG. 3 is a schematic plan view of a chuck mechanism provided on the pattern transfer apparatus of FIG. 2.
Figure 4:
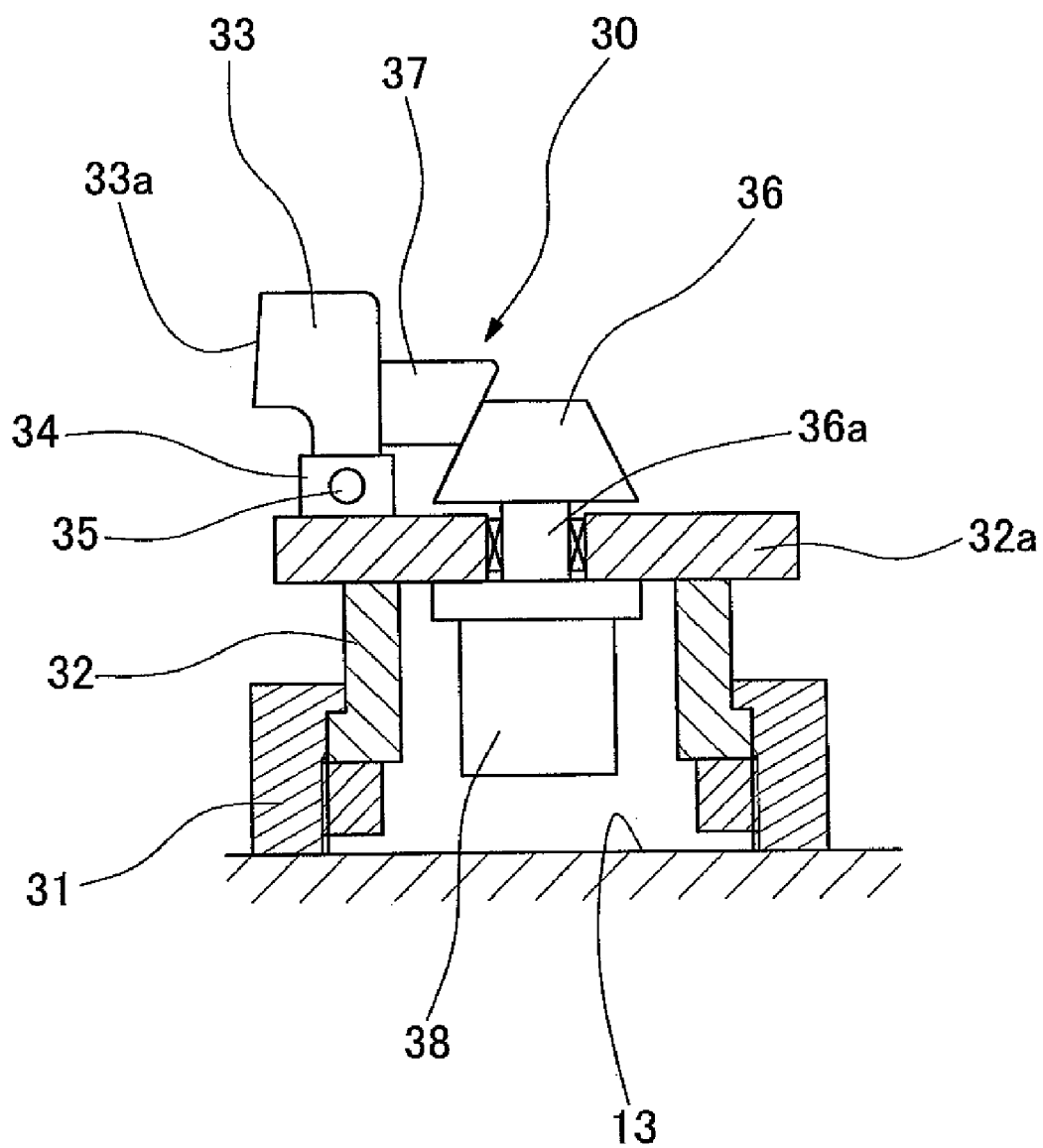
FIG. 4 is a schematic sectional view of a cam member provided on the pattern transfer apparatus of FIG. 2.

In FIG. 2, indicated at 30 is a chuck mechanism which is mounted on the base plate 13. As seen in FIGS. 3 and 4, a revolving drum member 32 is rotatably provided within a drum holder 31 which is fixedly mounted on the base plate 13, and three chuck pawls 33 are provided on a top plate 32a of the revolving drum member 32, at uniform angular intervals in the circumferential direction. Each one of the chuck pawls 33 is formed in an arcuate shape extending approximately through an angle smaller than 60 degrees, preferably through an angle slightly smaller than 60 degrees. Further, each chuck pawl 33 is pivotally supported on a pin or shaft 35 which is bridged between a pair of brackets 34, which are provided on the drum member 32. The chuck pawls 33 are each provided with a grip portion 33a of a predetermined length in the vertical direction. This grip portion 33a is movable into and out of contacting engagement with the center holes 1a and 2a of the mold 1 and substrate plate 2.

Normally, the chuck pawls 33 are located in receded positions, disengaged from the center holes 1a and 2a of the mold 1 and substrate plate 2, by a biasing means, for example, by a biasing spring which is mounted on each one of the shafts 35 and adapted to apply constantly a biasing force to the chuck pawl 33 in a radially inward direction. Thus, normally, each chuck pawl 33 is urged into a receded position by the biasing means, and retained out of contact with both of the mold 1 and the substrate plate 2. A cam member 36 of a truncated cone shape is located centrally of the hollow drum member 32, in engagement with tapered surfaces of cam followers 37 which are fixedly provided on the inner side of the chuck pawls 33, i.e., on the side away from the grip surface portions 33a. Thus, as the cam member 36 is put in an upward motion, the cam followers 37 are pushed radially outward, displacing the respective grip portions 33a into an operative position in engagement with at least the center hole 2a of the substrate plate 2. As shown in FIG. 4, for moving the cam member 36 in upward and downward directions, a solenoidal cam drive means 38 is connected to a shank portion 36a of the cam member 36.

Figure 5:
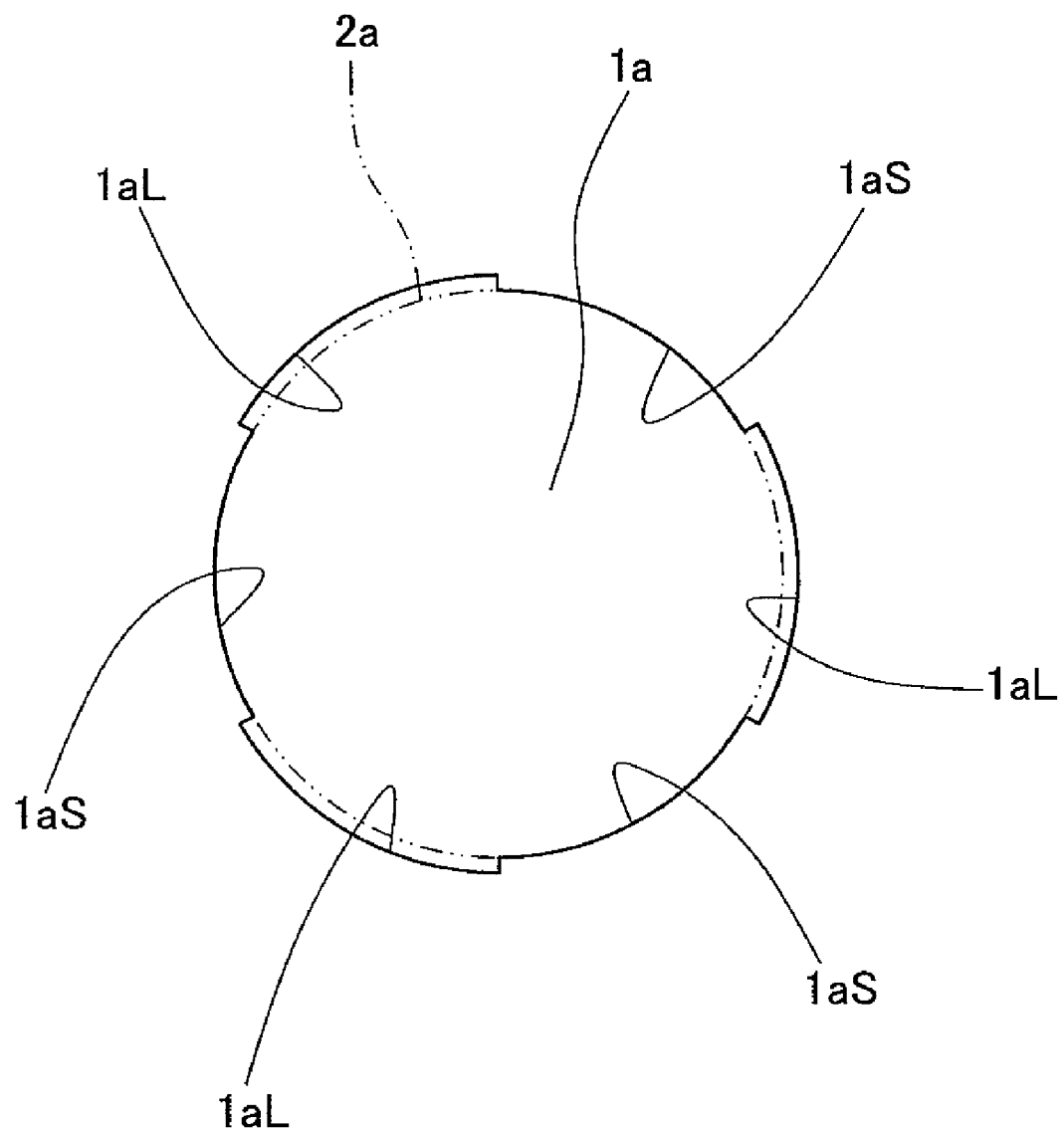
FIG. 5 is a schematic plan view of a transfer mold.

As seen in FIG. 5, the center hole 1a of the transfer mold 1 is not in the shape of a true circle. Namely, the center hole 1a defines small- and large-diameter segments 1aS and 1aL alternately at intervals of 60 degrees along and around the inner periphery of the mold 1. The small-diameter segments 1aS have a radius which exactly matches with the radius of the center hole 2a of the substrate plate 2, while the large-diameter segments 1aL are formed in a radius which is slightly larger than that of the small-diameter segments 1aS. The transfer surface 3 of the mold 1 is provided radially on the outer side of the large-diameter arc segments 1aL. These small- and large-diameter segments 1aS and 1aL around the center hole 1a of the mold 1 are provided firstly for the purpose of bringing a center of the substrate plate 2 into alignment with that of the transfer mold 1 and secondly for the purpose of separating the substrate plate 2 from the mold 1 upon completion of a pattern transfer to the substrate plate 2. Each one of the chuck pawls 33 of the chuck mechanism 30 can be turned to and fro to take either a position confronting a small-diameter segment 1aS or a position confronting a large-diameter segment 1aL of the center hole 1.

To this end, mounted on the base plate 13 is a cylinder 39 having a rod 39a connected to a movable plate 40 which is fixedly attached to the drum member 32. Thus, as the cylinder 39 is activated, the drum member 32 is turned back and forth approximately through 60 degrees. As a result, the chuck pawls 33 of the chuck mechanism 30 are turned back and forth relative to the center hole 1a of the transfer mold 1 to take either a position facing a small-diameter segment 1aS or a position facing a large-diameter segment 1aL of the center hole 1a. When the chuck pawls 33 which are located face to face with the small-diameter arc portions 1aS are driven radially outward from a receded position to an operative position, the respective chuck pawls 33 are brought into abutting engagement with the small-diameter segments 1aS at the inner periphery of the mold 1 and at the same time with the inner periphery of the substrate plate 2. As a result, the center of the substrate plate 2 is automatically set in a centered position in alignment with the transfer mold 1. When the chuck pawls 33 which are located face to face with the large-diameter segments 1aL are driven radially outward from a receded position to an operative position, the respective chuck pawls 33 are brought into abutting engagement with the inner periphery of the substrate plate 2 alone, and kept out of contact with the transfer mold 1. Thus, in this state, the substrate plate 2 can be detached and separated from the mold 1 on lifting down the lower press assembly 12.

With the pattern transfer apparatus according to the present invention, which is arranged in the manner as described above, a pattern of infinitesimally minute structures on a transfer surface 3 of a mold 1 can be transferred to and accurately imprinted on a coated resin layer 5 of a substrate plate 2 by the following method. In the first place, a transfer mold 1 is set in position on the upper pressing plate 18 of the upper press assembly 11. Since a plural number of suction passages 22, in communication with a vacuum pipe 21, are opened in the lower side of the upper pressing plate 18, the transfer mold 1 is securely fixed in position on the lower side of the upper pressing plate 18 by vacuum force. At this time, the transfer mold 1 should be set accurately in a centered position and at the same time in a correctly adjusted in the rotational direction. On the other hand, the substrate plate 2 is set on the lower pressing plate 15 of the lower press assembly 12. In this stage, it suffices to set the substrate plate 2 in a roughly centered position, and there is no need for adjusting the position in the rotational direction because the plate 2 is not required to have any directivity before a pattern transfer.

Figure 6:
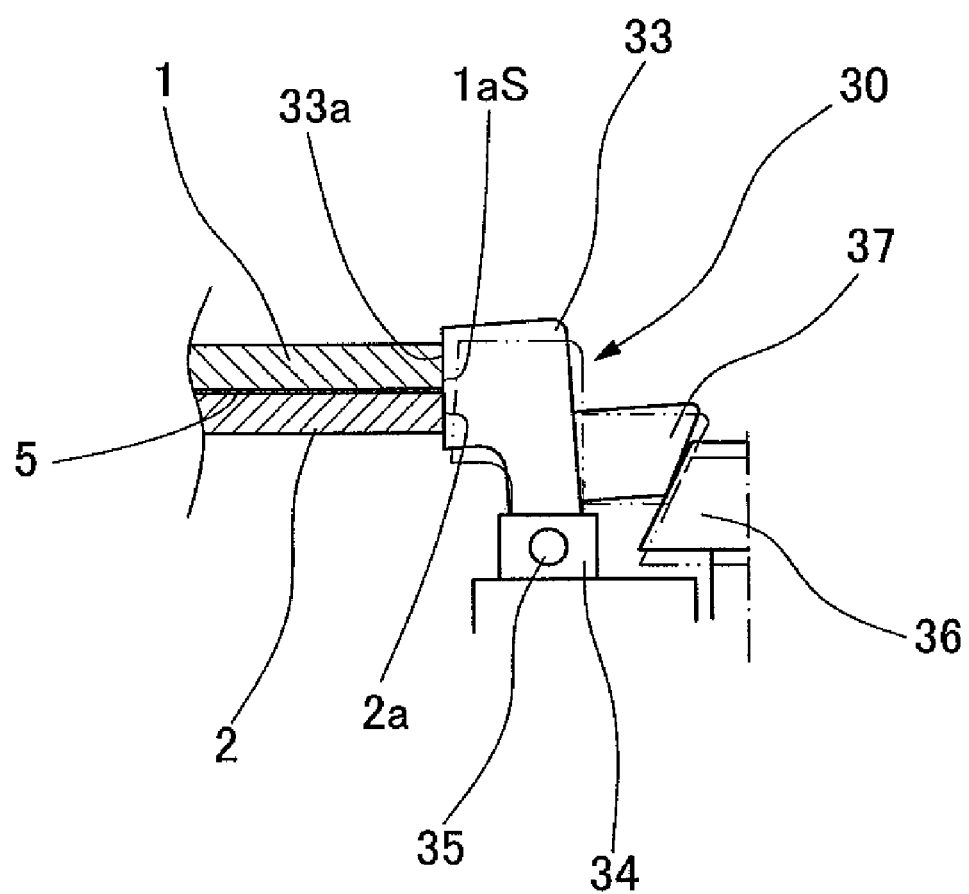
FIG. 6 is a schematic view of a substrate plate being set in an aligned position relative to a mold by chuck pawls.

After setting the mold 1 and the substrate plate 2 in position in the manner as described above, the lifting drive means 24 is actuated to lift up the lower pressing plate 15, as far as a position where the resin layer 5 on the top surface of the substrate plate 2 is located in close proximity to the mold 1, preferably in a non-contacting state. The lower pressing plate 15 is once stopped at that position to adjust the position of the substrate plate 2 relative to the transfer mold 1, locating the three chuck pawls 33 of the chuck mechanism 30 on the lower press assembly 12 in confront positions relative to the small-diameter segments 1aS of the center hole 1a of the mold 1. In this state, the cam member 36 is put in action to displace each one of the chuck pawls 33 to an operative position, indicated by a solid line in FIG. 6, from a receded position indicated by an imaginary line. As a result, the three chuck pawls 33 which are located in equidistant positions in the circumferential direction are brought into abutting engagement with the small-diameter segments 1aS of the center hole 1a of the mold 1. Thus, by the chuck pawls 33, the center of the substrate plate 2 is automatically set in alignment with that of the transfer mold 1.

As soon as the substrate plate 2 is positioned in alignment with the transfer mold 1, the chuck pawls 33 are displaced radially inward to return to the respective receded positions. Then, the lifting drive means 24 is put in an uplifting action again, pressing the substrate plate 2 against the transfer mold to imprint the resin layer 5 with the pattern of minute structures on the transfer surface 3 of the mold 1. At this time, the pattern can be transferred with high accuracy because nothing intervenes between the mold 1 and the substrate plate 2 and an imprinting pressure can be applied uniformly over the entire surface areas. After the pattern transfer, the substrate plate 2 which is still in engagement with the transfer mold 1 is irradiated with ultraviolet rays from the ultraviolet irradiation means 23. Since the mold 1 and the upper pressing plate 18 are made of a material with a high ultraviolet transmittivity like quartz glass, the resin layer 5 is irradiated efficiently with ultraviolet rays from the ultraviolet irradiation means 23 which is located over the upper pressing plate 18, and hardened smoothly and quickly.

Figure 7:
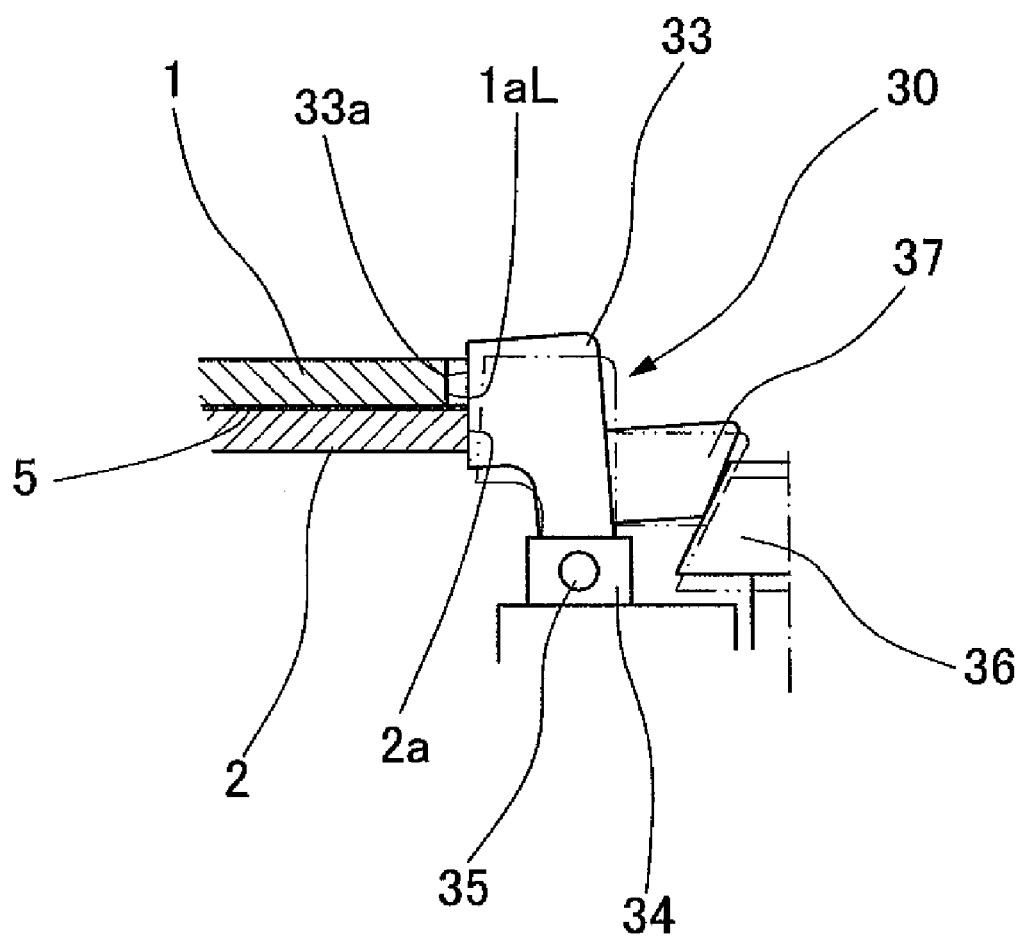
FIG. 7 is a schematic view of the substrate plate being separated from the mold by chuck pawls.

Upon completion of hardening by ultraviolet irradiation, the substrate plate 2 is separated from the transfer mold 1. For this purpose, the drum 32 is turned through a predetermined angle (approximately through 60 degrees). Since the chuck assembly 30 is mounted on the revolving drum 32, the chuck pawls 33 are turned with the revolving drum 32 when the latter is turned about its axis, and relocated in positions confronting the large-diameter segments 1aL of the center hole 1a of the transfer mold 1. In this state, the cam member 36 is put in an uprising motion, whereupon the chuck pawls 33 are displaced from a receded position to an operative position as indicated by imaginary and solid lines in FIG. 7. As a result, the respective chuck pawls 33 are brought into abutting engagement with the inner periphery of the substrate plate 2, but are retained out of contact with the large-diameter segments 1aL at the inner periphery of the transfer mold 1.

Then, the lifting drive means 24 is put in a descending operation to lift down the lower press assembly 12. By this operation, the chuck pawls 33 which are in abutting engagement with the substrate plate 2 are lowered away from the mold 1. Since the mold 1 is fixedly retained on the upper press assembly 11, the substrate plate 2 which is gripped by the three chuck pawls 33 is separated from the mold 1 and retained on the lower pressing plate 15. At the time of separation, the chuck pawls 33 are held in abutting engagement with the inner periphery of the substrate plate 2 alone, contacting neither inner peripheral edges nor top and lower surfaces of the substrate plate 2. Therefore, there is no possibility of the chuck pawls 33 causing scratches or other damages to functionally necessary portions of the substrate plate 2.

Now, the pressed substrate plate 2, which has been imprinted with a pattern on the resin layer 5, is ejected from the lower pressing plate 15, and replaced by a fresh substrate plate with a blank resin layer 6 to start a next cycle of pattern transfer.

What is claimed is:

1. A method for transferring a pattern of minute structures from a transfer mold mounted on one of two press members located opposingly for movements toward and away from each other and provided with a center hole defining three small-diameter segments and three large-diameter segments alternately along an inner periphery of said transfer mold, to a curable resin layer coated on an annular substrate plate mounted on the other press member and having an inside diameter exactly matching with small-diameter segments at the inner periphery of said mold, imprinting said pattern of minute structures on said resin layer by pressing same against said mold, characterized in that said method comprises the steps of:

moving one pressing member toward the other to position said mold and said substrate plate in close proximity to each other;

driving radially displaceable chuck pawls provided in at least three uniformly spaced positions around an inner periphery of said substrate plate to grip simultaneously both of said substrate plate and said small-diameter segments at the inner periphery of said mold thereby bringing centers of said substrate plate and said mold into alignment with each other;

disengaging said chuck pawls from the inner periphery of said substrate plate and pressing said press members to each other to imprint profiles of a transfer surface of said mold on said resin layer;

hardening said resin layer being still held in engagement with said mold; and driving said chuck pawls to grip said substrate plate at spaced positions from said large-diameter segments at the inner periphery of said mold and moving said press members away from each other to separate said substrate plate from said mold.

* * * * *